A. VONNEGUT.
SPINDLE ADJUSTMENT FOR MOTOR DRIVEN MOLDERS.
APPLICATION FILED MAR. 17, 1922.
1,436,465.
Patented Nov. 21, 1922.
2 SHEETS—SHEET 1.
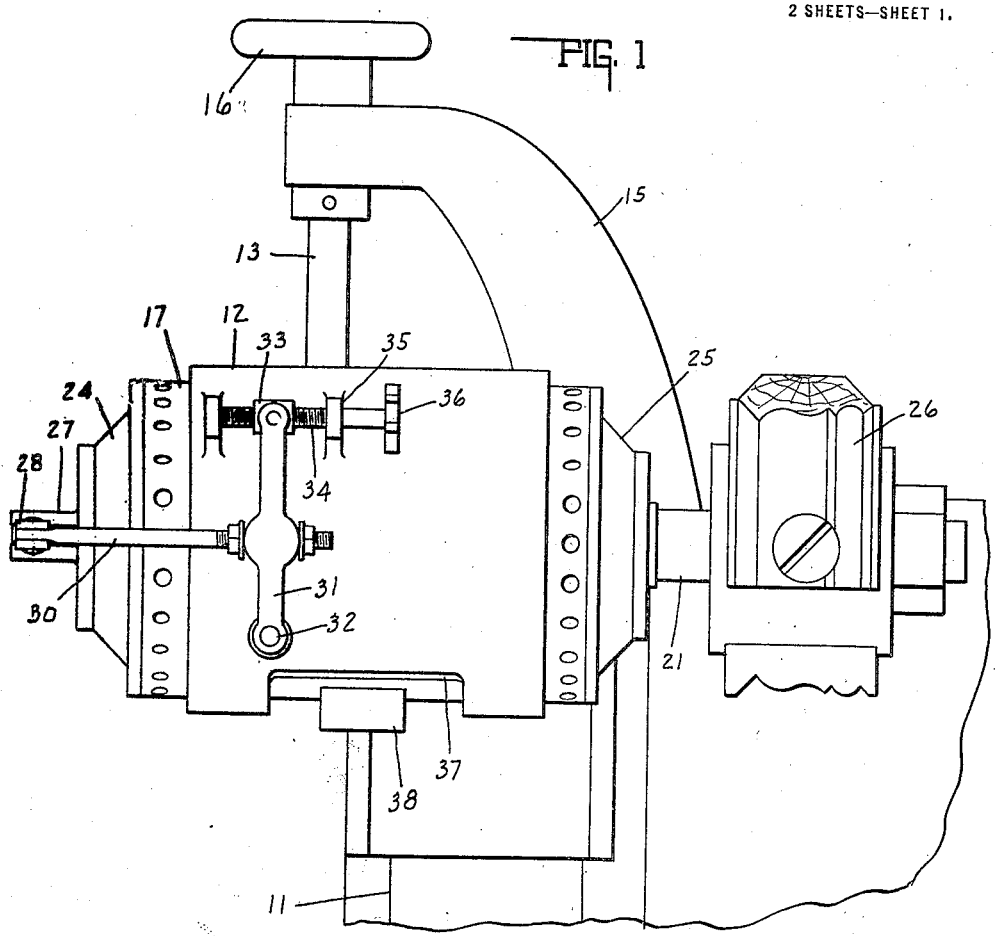
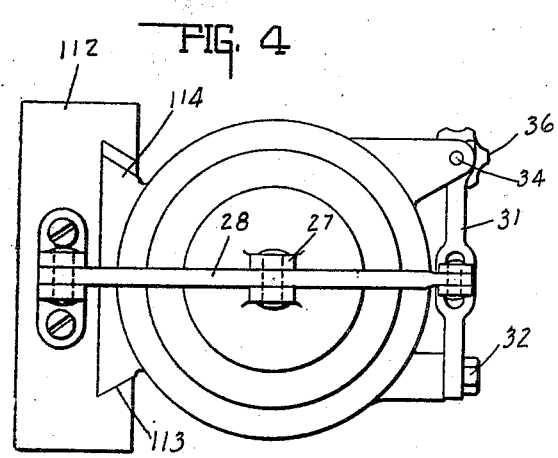
INVENTOR
ANTON VONNEGUT.
BY
ATTORNEYS A. VONNEGUT.
SPINDLE ADJUSTMENT FOR MOTOR DRIVEN MOLDERS.
APPLICATION FILED MAR. 17, 1922.
1,436,465.
Patented Nov. 21, 1922.
2 SHEETS—SHEET 2.
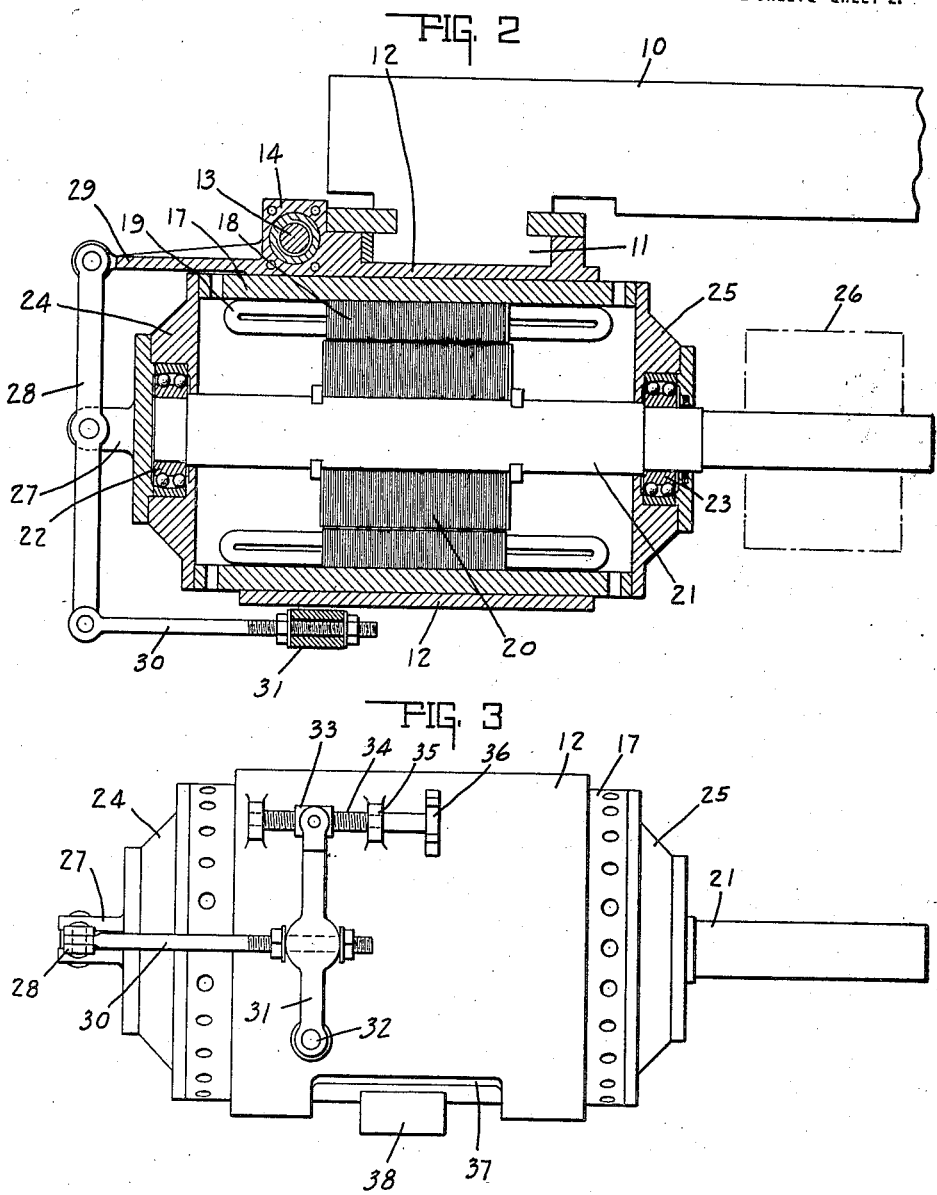
INVENTOR
ANTON VONNEGUT.
BY
ATTORNEYS.

Patented Nov. 21, 1922.

1,436,465

UNITED STATES PATENT OFFICE.

ANTON VONNEGUT, OF INDIANAPOLIS, INDIANA.

SPINDLE ADJUSTMENT FOR MOTOR-DRIVEN MOLDERS.

Application filed March 17, 1922. Serial No. 544,650.

*To all whom it may concern:*

Be it known that I, ANTON VONNEGUT, a citizen of the United States, and a resident of Indianapolis, county of Marion, and State of Indiana, have invented a certain new and useful Spindle Adjustment for Motor-Driven Molders; and I do hereby declare that the following is a full, clear, and exact description thereof, reference being had to the accompanying drawings, in which like numerals refer to like parts.

This invention relates to an improvement in molding machines and more particularly to that type of molding machine, wherein the cutter head and spindle is driven direct by an electric motor rather than by the usual belt and pulley.

It is the object of this invention to provide a direct motor drive for the cutter head and spindle wherein the motor housing is adjustably supported directly upon the frame or carriage of the machine so the motor housing, spindle and cutter head will be adjusted both vertically and longitudinally.

For enabling a more complete understanding of this improvement, reference may be had to Patent No. 1,264,165, issued April 30, 1918, for molding machine, wherein the rotor irons of the motor is adjustable with the spindle and cutter head within the stator irons of the motor. Reference may also be had to Patent No. 1,340,709, issued May 18, 1920, for spindle adjustment for motor driven motors wherein the spindle, cutter head and motor are adjustable as a unit, but are supported by a motor head extension bearing slidably mounted longitudinally in a carriage, the carriage being vertically adjustable with respect to the frame. This invention eliminates the necessity of providing such a motor head extension bearing, one set of bearings for the spindle and that portion of the spindle extending through the extension bearing.

In addition to eliminating these parts, this construction makes a more compact machine so arranged that the motor housing will not extend outwardly from the frame as contemplated in the above mentioned patent.

The full nature of this invention will be understood from the accompanying drawings and the following description and claims.

In the drawings Fig. 1 is a side elevation of the motor and cutter head. Fig. 2 is a horizontal cross section through the motor and cutter head. Fig. 3 is a plan view looking down thereon. Fig. 4 is an end view of the motor showing a modified form of supporting the same.

In the drawings there is shown a portion of the frame 10 of the molding machine, such as is used for cutting surfaces of timber in any desired design, said machine being of the ordinary construction having four cutter heads, each of the cutter heads being operable independently of the others and in position to engage one of the four sides of the timber to be cut, and independently driven by electric motors.

The frame 10 is provided with a vertically extending plate 11 upon which is slidably mounted a supporting sleeve or mounting 12 adapted to be vertically adjusted upon the frame by means of the screw 13 screwing into the block 14 rigidly secured thereto. The screw 13 is supported by the derrick-like arm 15 and is manipulated by the hand wheel 16. Supported in the mounting 12, so as to be slidable longitudinally thereof, there is a motor housing 17 containing a motor stator 18 having stator windings 19 and a motor rotor 20 keyed to the spindle 21. The spindle 21 extends centrally through the motor housing and is supported upon the motor bearings 22 and 23 which are carried in the motor heads 24 and 25 respectively. The spindle extends through the head 25 of the motor for carrying and rotating the cutter head 26.

The mounting 12 surrounds the housing of the motor which is substantially cylindrical so that said motor housing readily slides longitudinally therein. The mounting 12 is slidably supported by the plate 11 so as to be adjusted vertically thereon by the screw 13, whereby the motor, spindle and cutter head may be both longitudinally and vertically adjusted with respect to the frame of the machine.

For adjusting the motor horizontally, there is provided an ear 27 secured to the end plate 24 of the motor on which is centrally pivoted a lever 28. One end of the lever 28 is pivoted to the arm 29 extending from the mounting 12 on one side thereof and the other end of said lever is pivoted to the rod 30 adjustably secured to the other side of said mounting. The opposite end of the rod 30, from the lever 28 is secured to an arm 31 which is pivoted to the mounting at 32 and is provided with a screw connection 33 at the other end thereof. The lever 31 is moved back and forth by the screw 34 extending through the bearings 35 secured to said mounting, said screw being turned by the hand wheel 36. By means of this arrangement upon the turning of the hand wheel 36, the lever 28 is moved back and forth so as to cause the motor housing to slide back and forth within the mounting 12. For this purpose there is sufficient play in the connections between the lever 28 and ear 27, and the rod 30 and the lever 31 to permit their full movement. The lower part of the mounting is cut away at 37 so as to permit the terminals 38 to extend therethrough and move longitudinally thereof.

In the modified form shown in Fig. 4, there is provided a mounting 112 in place of the sleeve mounting 12 which is slidable vertically upon the frame 10 as heretofore described, and which is provided with a longitudinal keyway 113 which is adapted to receive an extension 114 of the motor housing so as to be longitudinally slidable therein. This arrangement simply eliminates the sleeve mounting of the motor and provides a simplified mounting which serves substantially the same purpose in the same manner. The motor may be adjusted longitudinally within the mounting in any well known manner, not shown herein, either as above described or as illustrated in the above mentioned Patent No. 1,340,709.

The invention claimed is:

1. A spindle attachment for motor driven molders including a frame, a mounting adjustably supported on said frame, a motor driven cutter head spindle, a motor housing slidably secured direct to said mounting so as to be slidably adjusted thereon, in which said spindle is rotatably supported, an adjusting lever pivotally connected with said mounting and housing for adjusting the position of said motor housing upon said mounting, and means for actuating said lever whereby the proper adjustment of said cutter head may be obtained.

2. A spindle attachment for motor driven molders including a frame, a mounting adjustably supported on said frame, a motor driven cutter head spindle, a motor housing slidably carried by said mounting, in which said spindle is rotatably supported, an adjusting lever pivotally connected between its ends to said housing and means on said mounting and pivotally connected with said lever for adjusting the position of said housing.

3. A spindle attachment for motor driven molders including a frame, a mounting adjustably supported on said frame, a motor driven cutter head spindle, a motor housing slidably carried by said mounting, in which said spindle is rotatably supported, a lever attached to said housing and pivoted at one end to said mounting, an adjusting screw mounted on said mounting, and a connecting rod movable by said adjusting screw and attached to said lever for causing said lever to move said motor housing back and forth with respect to said mounting.

In witness whereof, I have hereunto affixed my signature.

ANTON VONNEGUT.